United States Patent [19]

McCall et al.

[11] Patent Number: 5,430,814
[45] Date of Patent: Jul. 4, 1995

[54] TEMPERATURE TRANSIENT DETECTION SYSTEM FOR SUPERCONDUCTING MAGNETS

[75] Inventors: Gene H. McCall; Daniel S. Pappas; George W. York, all of Los Alamos, N. Mex.

[73] Assignee: Advec Corporation, Los Alamos, N. Mex.

[21] Appl. No.: 178,110

[22] Filed: Jan. 5, 1994

[51] Int. Cl.⁶ .................. G02B 6/10; G01R 33/035
[52] U.S. Cl. ........................... 385/12; 385/13; 324/207.13; 250/227.19; 250/227.27; 505/845; 505/847
[58] Field of Search .................. 385/12, 13, 6; 324/207.12, 207.13; 374/130, 131, 161; 250/231.16, 227.14, 227.19, 227.27; 356/350; 505/845, 847

[56] References Cited

U.S. PATENT DOCUMENTS

| | | | |
|---|---|---|---|
| 4,671,113 | 6/1987 | Carome | 250/227.19 X |
| 4,675,522 | 6/1987 | Arunkumar | 250/227.19 |
| 5,198,761 | 3/1993 | Hashimoto et al. | 324/207.12 |

FOREIGN PATENT DOCUMENTS 63-190313  8/1988  Japan .

OTHER PUBLICATIONS

O. Tsukamoto et al., "Detection of Temperature Rise at 4.2K by Using Dual-Core Optical Fiber—An Optical Method to Detect a Quench of a Superconducting Magnet," 31 Adv. Cryo. Eng., Plenum House, N.Y. (1986).
Krohn, *Fiber Optic Sensors, Fundamentals and Applications,* Ch. 4, "Phase-Modulated Sensors," Instrument Society of America, Research Triangle Park, N.C. (1988).

*Primary Examiner*—John D. Lee
*Assistant Examiner*—Hemang Sanghavi
*Attorney, Agent, or Firm*—Ray G. Wilson

[57] ABSTRACT

A fiber optic system detects temperature transients in a superconducting magnet. A signal optical fiber is placed in function proximity with the superconducting magnet for responding to a temperature transient condition and a reference optical fiber is remote from the signal optical fiber. A coherent light outputs coherent light for input to the signal and reference optical fiber to provide a phase shift of about 90° to the coherent light in the signal or reference optical fiber. In one embodiment, a low pass filter provides feed back to the phase modulator to stabilize the modulation while a high pass filter passes temperature transient signals to a suitable analyzer, such as a digital storage oscilloscope, or the like.

6 Claims, 6 Drawing Sheets

TEMPERATURE TRANSIENT DETECTION SYSTEM FOR SUPERCONDUCTING MAGNETS

BACKGROUND OF THE INVENTION

This invention relates to the detection of temperature transient conditions in superconducting magnets and, more particularly, to the use of fiber optics to detect temperature transient detection in superconducting magnets.

It is a characteristic of superconducting magnets that the superconducting wire forming the magnet coil may undergo a spontaneous quench condition, i.e., change from a superconducting state to a normal state. A quench condition is a very localized condition that results in a localized hot spot from the sudden increase in wire resistance and concomitant resistance heating. This localized heating can produce temperatures in excess of 400–800 K. that cause failure in the wire insulation and degradation of the superconductor critical current. Thus, it is highly desirable to detect a temperature transient condition and apply rapid heating to the entire magnet in a time scale commensurate with the onset of the temperature transient, in the order of 100 msec.

Fiber optic-based systems have been used for temperature transient detection. Fiber optic-based systems have many advantages over conventional voltage monitor systems for quench detection, e.g., very low thermal conductivity, high resistance to EMI interference (with resulting low false trigger rates), high radiation resistance, reduced mechanical complexity, high system reliability due to a reduced number of components, and efficient multiplexing capabilities. O. Tsukamoto et al., "Detection of Temperature Rise at 4.2 K. by Using a Dual-Core Optical Fiber—An Optical Method to Detect a Quency of a Superconducting Magnet," 31 Advances in Cryogenic Engineering, Plenum House, New York (1986), pp.1269, teaches an optical fiber system using a dual-core fiber. A temperature rise of 1.0 K. at 4.2 K. is detected, equivalent to a quench in a superconducting magnet. As taught by Tsukamoto, a laser light is split and input to outer and core fibers. A temperature transient condition causes a change in the optical length of the outer fiber, primarily from a change in the refractive index, wherein interference fringes are formed when the light signals from the inner and outer fibers are combined at the output of the dual-core optical fiber. The dual-core fibers are, however, somewhat difficult to incorporate into a magnet winding. The dual core fiber also has a sensitivity limitation since both fibers are adjacent any temperature transient event so both the outer and inner fiber are responding to the same temperature change, albeit at different rates. Further, dual-core fibers require doped fibers that are inherently radiation sensitive and would not be useable in some important applications, e.g., high energy particle accelerators, such as the superconducting supercollider, and superconducting magnets for fusion application, e.g. ITER.

Tsukamoto does teach that two single-mode fibers may be used in a Mach-Zender arrangement to improve on the sensitivity of the dual fiber arrangement. Then, one fiber provides a reference signal and the other fiber a temperature signal. Tsukamoto notes, however, that there are difficulties in placing this arrangement in a cryogenic region and in making the system compact enough to be a quench detector. There is no teaching about placing the reference and temperature sensor fibers on superconducting magnets, but the statement on placement difficulties and the teachings on the dual core fibers infer that the two fibers are placed on the same magnet to subject both fibers to the same environment to minimize noise Accordingly, it is an object of the present invention to provide a single-core optical fiber system for detecting temperature transients in superconducting magnets, wherein only a single fiber is incorporated in a magnet to limit the space required to incorporate the fiber sensor.

It is another object of the present invention to provide a high sensitivity system using separated reference and sensor fibers for rapid detection of temperature transients in superconducting magnets.

It is a further object of the present invention to detect temperature transients in superconducting magnets using undoped optical fibers for improved transmission stability in a high radiation environment.

One other object of the present invention is to provide a Mach-Zender type arrangement with improved noise rejection.

An additional object of the present invention is to reduce the number of detector fibers required in large systems.

Still another object of the present invention is to reduce the number of false quench alarms arising from a large array of superconducting magnets.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a system for detecting a temperature transient in a superconducting magnet using a signal optical fiber in functional proximity with the superconducting magnet for responding to a temperature transient condition and a reference optical fiber remote from the signal optical fiber. A coherent light source outputs coherent light for input to the signal and reference optical fibers. A phase modulator is functionally connected to the signal optical fiber or the reference optical fiber to provide a phase shift of about 90° to the coherent light in the signal or reference optical fiber. An interferometer then detects a relative phase difference in coherent light output from the signal and reference optical fibers. A peak sample and hold circuit is connected to feed back light output from the signal or the reference fiber to the phase modulator to stabilize the modulator. In one embodiment, a low pass filter provides feed back to the phase modulator to stabilize the modulation while a high pass filter passes temperature transient signals to a suitable analyzer, such as a digital storage oscilloscope, alarm, or the like.

In another embodiment of the present invention, a fiber optic system provides for detecting a temperature transient in an array of superconducting magnets. A first signal optical fiber is provided in functional proximity with a first plurality of the superconducting magnets. A second reference optical fiber is provided in functional proximity with a second plurality of the superconducting magnets distinct from the first plurality of magnets. A coherent light outputs light for input to the signal and reference optical fibers. A phase modulator is functionally connected to the signal optical fiber or the reference optical fiber to provide a phase shift of about 90° to the coherent light in the signal or reference optical fiber. An interferometer then detects a relative phase difference in coherent light output from the signal and reference optical fibers. In one embodiment, the output signal is input to a low pass filter to provide modulator stabilization for noise reduction and a high pass filter for temperature transient signal detection.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Temperature transient detection according to the present invention uses a pair of optical fibers (hereinafter "fibers") where one fiber is wound on a superconducting magnet core with the superconducting wire and forms a signal arm in a Mach-Zender sensor arrangement. The other fiber is formed as a reference arm at a location remote from the signal arm, i.e., at a location that is unlikely to experience a temperature transient simultaneously with a temperature transient affecting the signal arm. It will be recognized that the designation of one optical fiber branch as the signal arm or the reference arm is arbitrary since both arms may be incorporated in magnets for temperature transient detection. As herein explained, the present invention incorporates circuitry for stabilizing the reference arm optical length to minimize or eliminate false quench signals and also provides for forming a fiber array to detect and locate quench conditions in an array of superconducting magnets such as may be found in the superconducting supercollider or in a fusion device.

To illustrate the principles involved, consider that when a magnet quenches, the quench propagates away from the initial quench point at a velocity of from 50–100 m/sec and the temperature rises approximately 50 K. Since the change in the index of refraction of fused silica per degree at 4 K. is approximately $5 \times 10^{-7}$ K.$^{-1}$, the 50 K. rise will result in a change of the index of refraction of about $2.5 \times 10^{-5}$. If coherent light is passed through a fused silica optical fiber that experiencing the heating transient described above and is interfered with light passing through an identical length quiescent reference fiber, a phase shift of $\pi$ radians will occur between the light beams in the reference and the detector fibers when a length of approximately 60 mm has been heated to 50 K. (assuming instantaneous heat transfer to the core of the fiber). At a temperature transient propagation velocity of 50 m/sec, the time required for this propagation is approximately 1.2 msec. The estimated time for thermal diffusion to the core of a nominal fiber is on the order of 5 msec, so there is a 5 msec delay before the heating is propagated to the core of the fiber.

This should represent an upper limit since the outer portions of the fiber are experiencing temperature rises earlier than the core region and introducing phase shifts in the output signal. Furthermore, phase shifts of much less than $\pi$ radians are easily detectable. Thus, the index change is much faster than required by the application. By the time the temperature transient has propagated 50 cm (10 msec) with a 50 K. temperature rise, a phase shift of over 6 radians would have been generated at the core of the fiber. This is a signal that is several orders of magnitude greater than the detection threshold.

Figure 1:
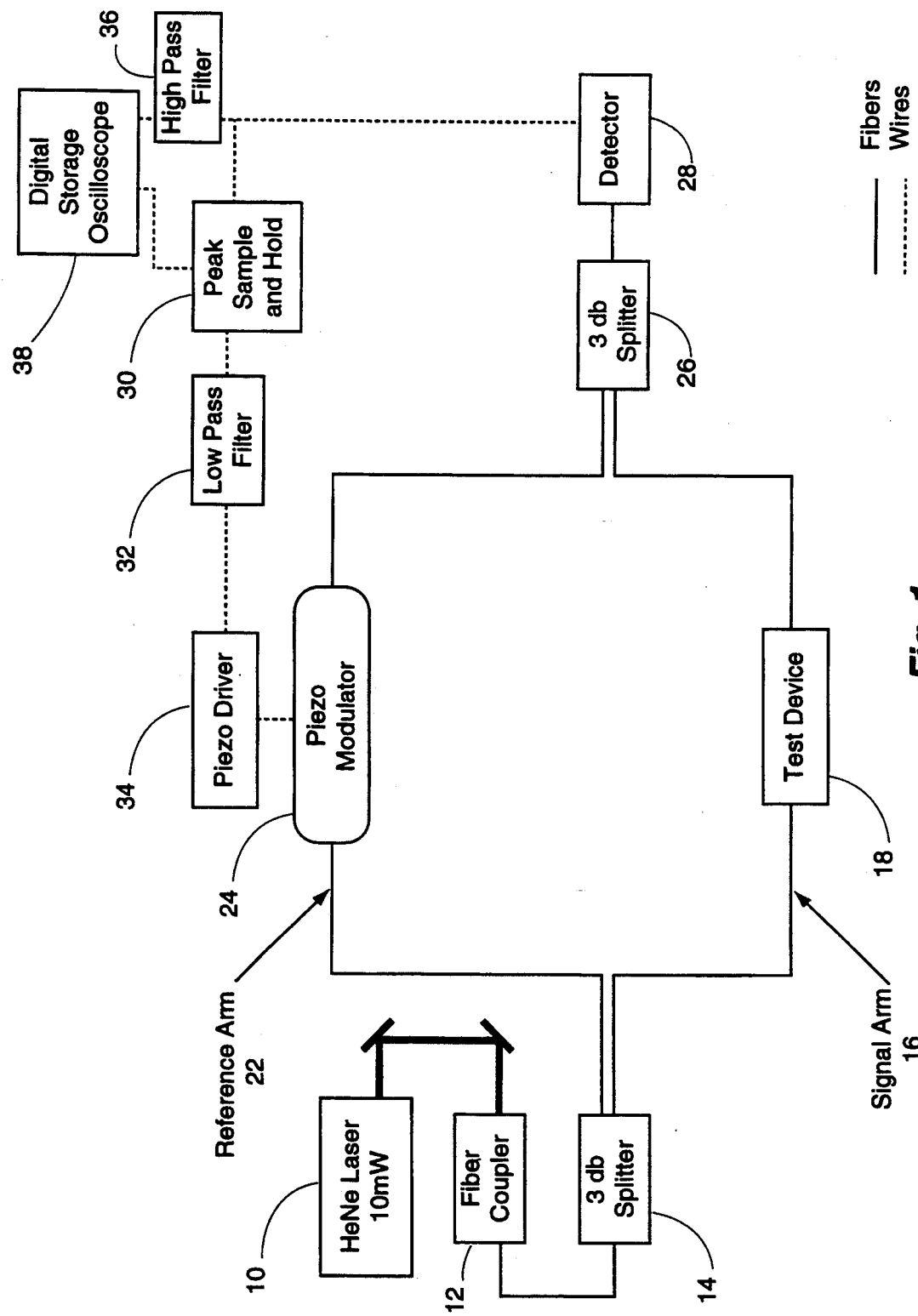
FIG. 1 is a schematic diagram in block diagram form of a fiber-optic temperature transient detector according to one embodiment of the present invention.

The basic design of one embodiment of a temperature transient detector according to the present invention is shown in FIG. 1. Laser source 10, which may be a 10 mW HeNe laser operating at 632.8 nm, outputs coherent light to fiber coupler 12 for input to 3 db splitter 14. In another embodiment, laser source 10 may be a solid state laser, e.g., a diode laser with a wavelength of about 1.2 μm. Splitter 14 outputs balanced coherent light to two fibers forming signal arm 16 and reference arm 22. Single mode fibers are preferred to maximize transmission and to maintain optical coherence. Thus, signal arm 16 is a length of single mode fiber that is wound along with superconducting wires to form coils about a magnet core (not shown). Reference arm 22 is the same length of single mode fiber as signal arm 16 and is attached to modulator 24, which may be a piezoelectric modulator crystal, to modulate the detected signal. Signal arm 16 and reference arm 22 are recombined through 3 db splitter 26 to output a combined signal for input to detector 28.

Figure 2:
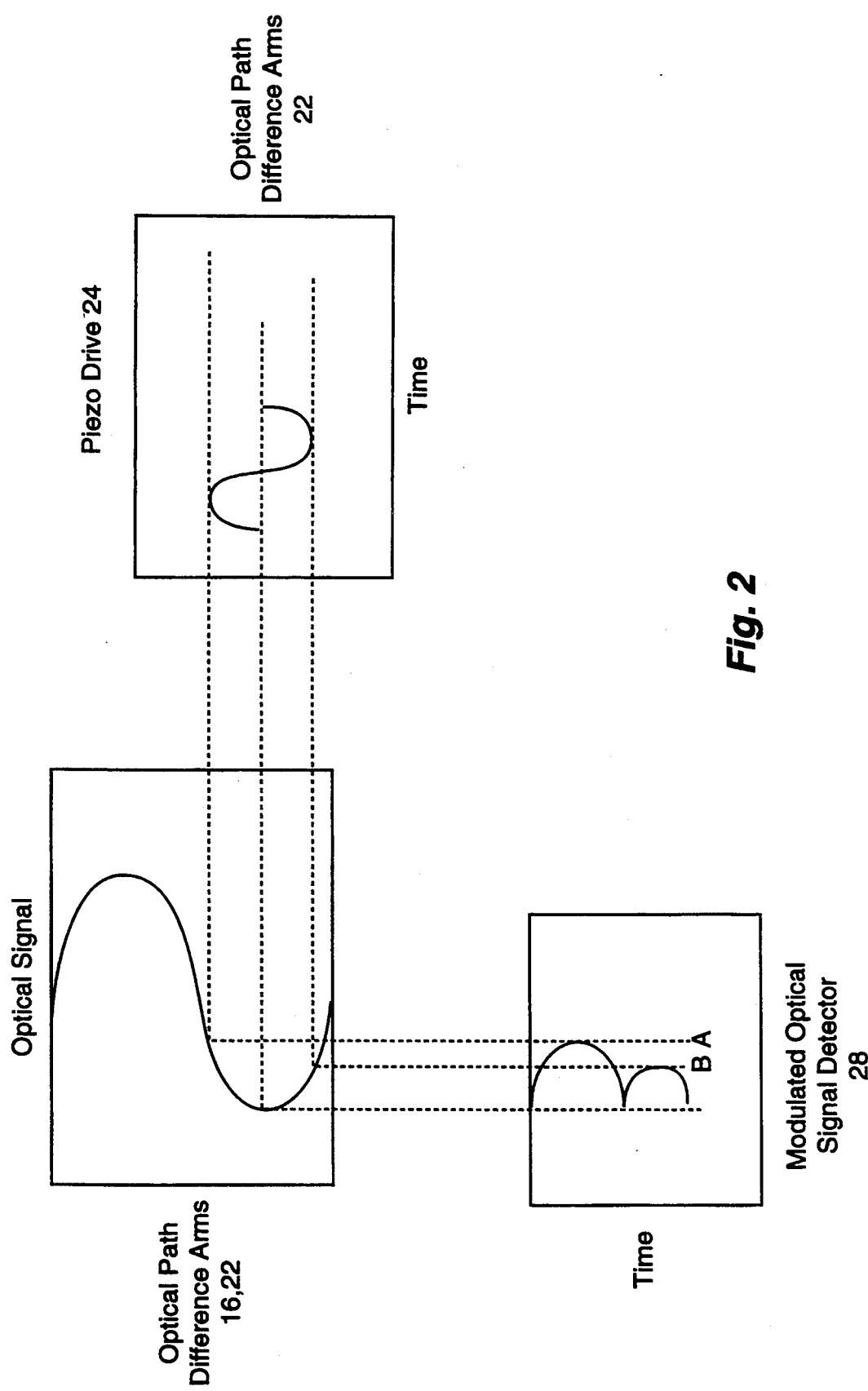
FIG. 2 is a graphical representation of a detector output signal.

The output from detector 28 (FIG. 1) is depicted in FIG. 2 and is a signal that is modulated by the action of modulator 24 and by the occurrence of a temperature transient in signal arm 16. Modulator 24 is driven by oscillator 34 to provide a periodic change in the optical path length of reference arm 22 and modulates the output from detector 28 from periodic interference effects as the light in signal arm 16 and reference arm 22 move from being in phase to being out of phase under the action of modulator 24. The interference pattern that is output from detector 28 is comprised of two offset peaks having a frequency twice the frequency of modulator 24. The difference in amplitude of the peaks is a measure of the difference in optical refraction along the lengths of reference and signal optical fibers. A temperature transient event along on of the fibers will introduce an additional phase relationship in light output from fibers 16 and 22 to change the relative amplitudes of the interference peaks as a function of a temperature transient in one of the fibers.

The output signal from detector 28 shown in FIG. 2 is input to peak sample and hold circuit 30, which detects the relative intensity of the two peaks and outputs a signal related to the difference in intensity. The output signal from peak sample and hold circuit 30 is fed back to oscillator driver 34 through low pass filter 32. The signal passed by low pass filter 32 will cause the bias level of modulator 24 to compensate for slow path length variations in either the reference 22 or signal 16 arms due to noise, e.g., mechanical effects or slow thermal transients. Temperature transient events are expected to be very fast (>1 KHz) and will be filtered out by the low pass filter, so that the modulator will not compensate for phase shift caused by a temperature transient signal.

A temperature transient signal is then passed by high pass filter 36 (FIG. 1) for detection as a change in the amplitude difference between the two detected signal peaks. This output signal can be used as an alarm signal and/or a process signal for action that prevents magnet coil damage, e.g., heating of the coil to minimize temperature gradients.

Figure 3:
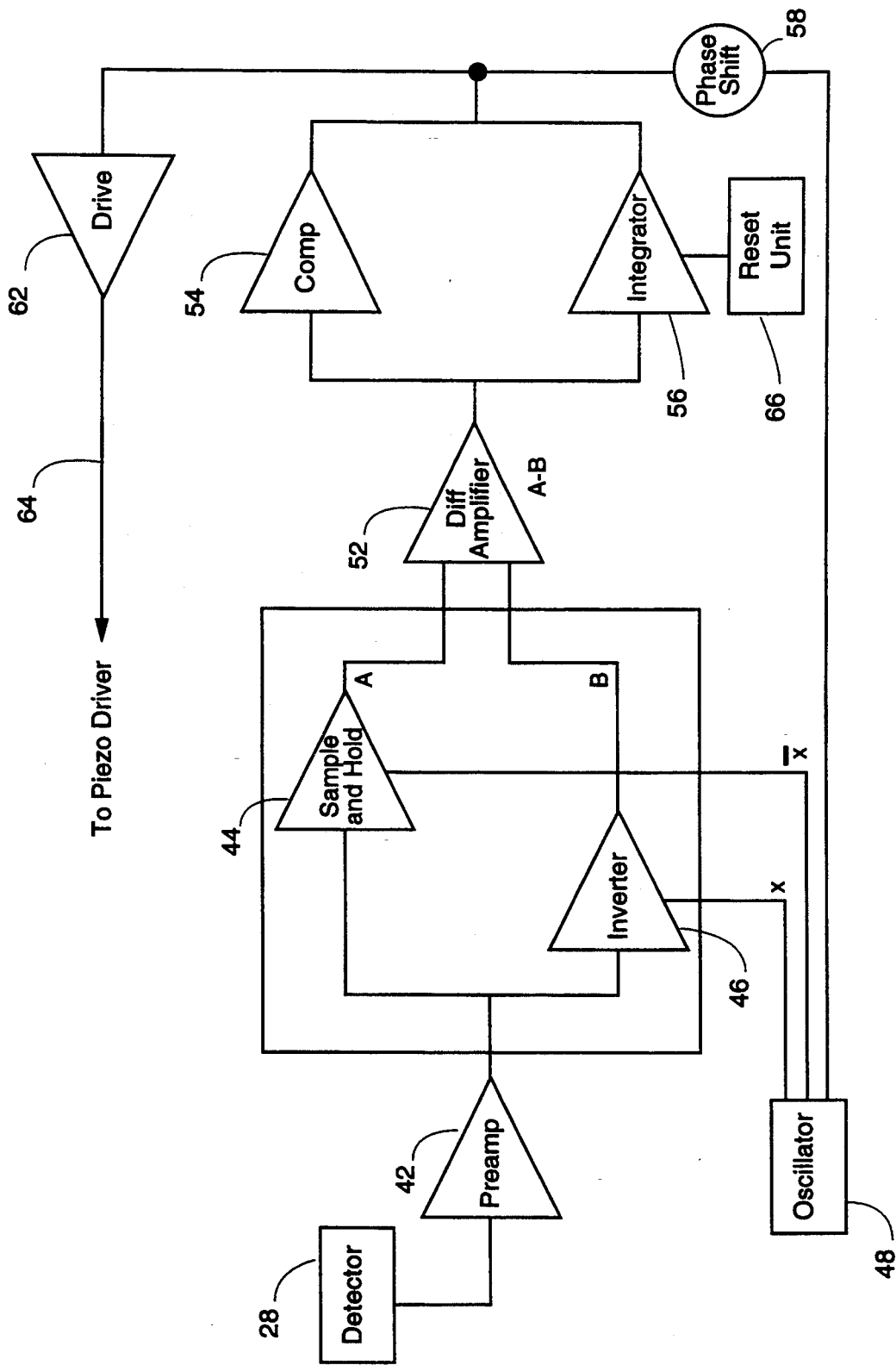
FIG. 3 is a schematic diagram in block diagram form of a peak sample and hold circuit for use in the detector shown in FIG. 1.

A block diagram for peak sample and hold circuit 30 is shown in FIG. 3. The input signal to circuit 30 is output by detector 28 and shown in FIG. 2, which shows a sinusoidal fringe, whose peak amplitude is a function of the optical path length with a length modulation impressed on the optical path length by phase modulator 24. The optical signal is represented by positive lobes, the amplitudes of which depend upon the displacement of the working point. The optical signal contains a component at twice the modulating frequency and also contains a phase sensitive component at the modulating frequency. Alternate peaks of the lobes are sampled and held.

Thus, the output from detector 42 is amplified by preamplifier 42 for input to sample and hold module 44 and to inverter 46. Modulation oscillator 48 provides a sampling signal (on alternate periods) to hold 44 and inverter 46, which also includes a sample and hold function. Thus, alternate periods of the optical signal are sampled and are summed (with one signal inverted) by differential amplifier 52, which outputs a positive or negative signal that is proportional to the amplitude and direction of the displacement of the working point from the fringe minimum. The output from amplifier 52 is then integrated by integrator 56 and summed with the modulation carrier from oscillator 48 at the input to driver 62 for driving modulator 24. Additionally, compensation network 54 provides a feed-forward compensation for driver 34 (FIG. 1). In conjunction with the integrator gain, the signal helps to control the damping for driver 34. Phase shifter 58 compensates for the time constants of detector 28 and phase modulator 24. The combined output is the recovered signal from detector 28 for input to drive circuit 62 for input signal 64 to modulator driver 34 (FIG. 1). Integrator 56 has a limited dynamic range and is therefore reset when its output reaches a preset level. Reset unit 66 senses when integrator 56 has saturated and resets it to selected level.

Modulator 24 may be a piezo-electrically driven wafer mounted on a support form and wound with enough fiber turns to obtain a desired stretch in length. Typically, the stretch is about 1 micron per 40 volts per 1.5 inch segment of fiber. A single turn of fiber on the mount requires 20 volts per micron and a maximum of 25 turns are possible without degradation of the amplitude response. A suitable piezo driver will accept a maximum drive voltage of 200 volts and can be controlled with a ±5 volt modulation signal. For the maximum drive voltage, the response is limited to a maximum of 2 kHz. Faster response (up to 100 kHz) is possible, but the voltage must be reduced and the amplitude is reduced to a fraction of a fringe.

Figure 4:
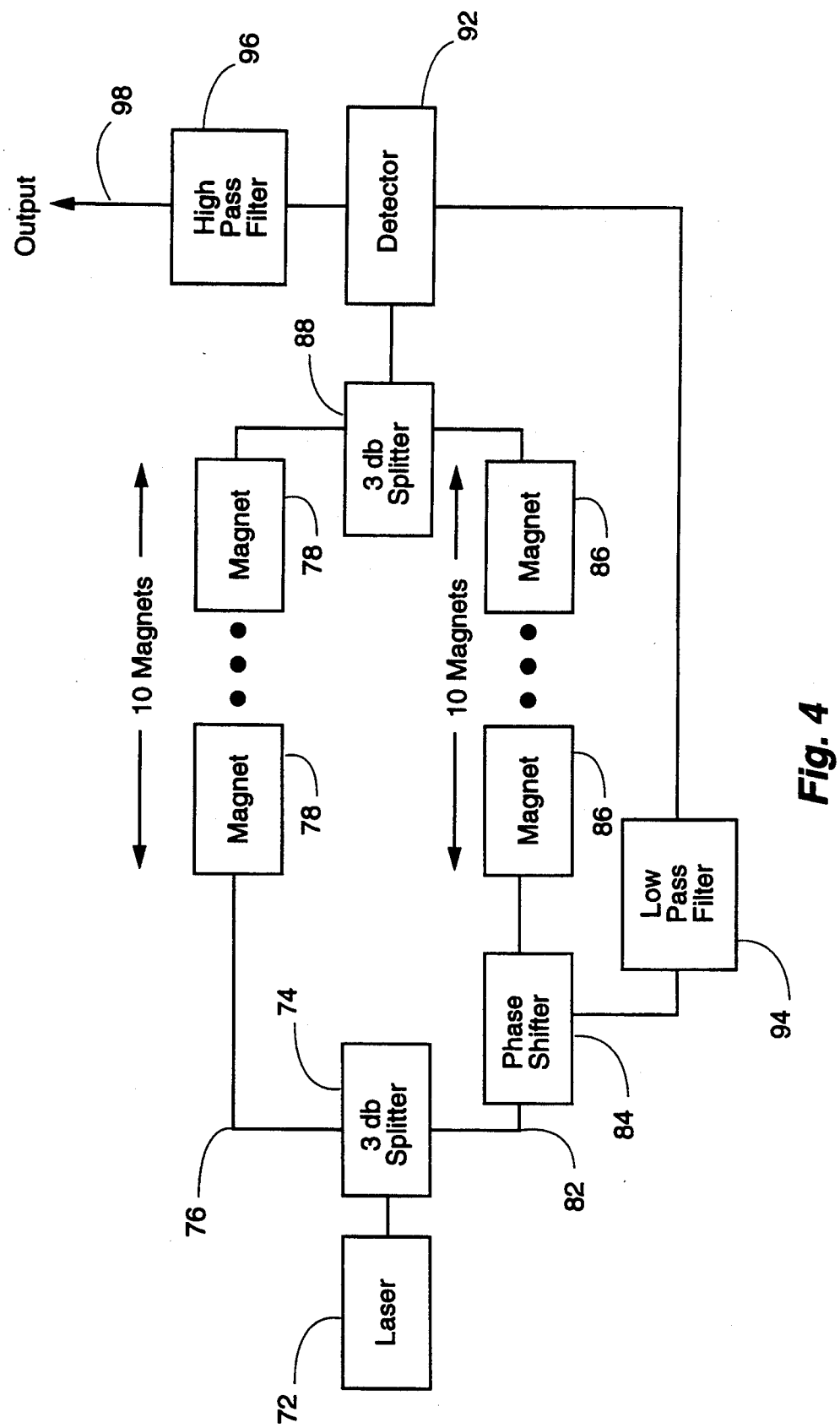
FIG. 4 is a schematic diagram in block diagram form of a fiber-optic temperature transient detector according to another embodiment of the present invention

Referring now to FIG. 4, there is shown an optical fiber temperature transient detection system for use with a plurality of magnets. Assuming a magnet design for use with the superconducting supercollider, each magnet includes four quarter coils, with inner and outer coils consisting of 16 turns and 20 turns, respectively. Each turn is 15.4 m long and a pair of fiber optic cables may be wound along with each superconducting cable. This results in a total of 36 windings for a complete magnet. Since each fiber optic winding would require about 31 m of length, the total fiber optic length per magnet assembly would be on the order of 1 km. A temperature transient would be detected as soon as the temperature-length product at the temperature transient site exceeds the sensitivity of the detector (which occurs in about 5 msec).

For the magnet design discussed above, and assuming a reasonable quality fiber optic cable having an attenuation of 2 db/km, 10 cables can be wound in series, yielding a total attenuation of 20 db, which will provide more than adequate signal-to-noise using solid state lasers and detectors. As noted above, the choice of signal and reference arms is arbitrary so that 10 magnets 78 can be placed in the signal arm 76 and 10 magnets 86 in the reference arm 82. As discussed above, monitoring light from laser 72 is split by splitter 74 for balanced input to each arm. Likewise, the return signals are combined through splitter 88 for detecting the combined signal on detector 92. The detected signal is input through low pass filter 94 to phase shifter 84, which includes the components of sample and hold circuit 30, driver 34, and modulator 24 shown in FIG. 1.

Figure 5:
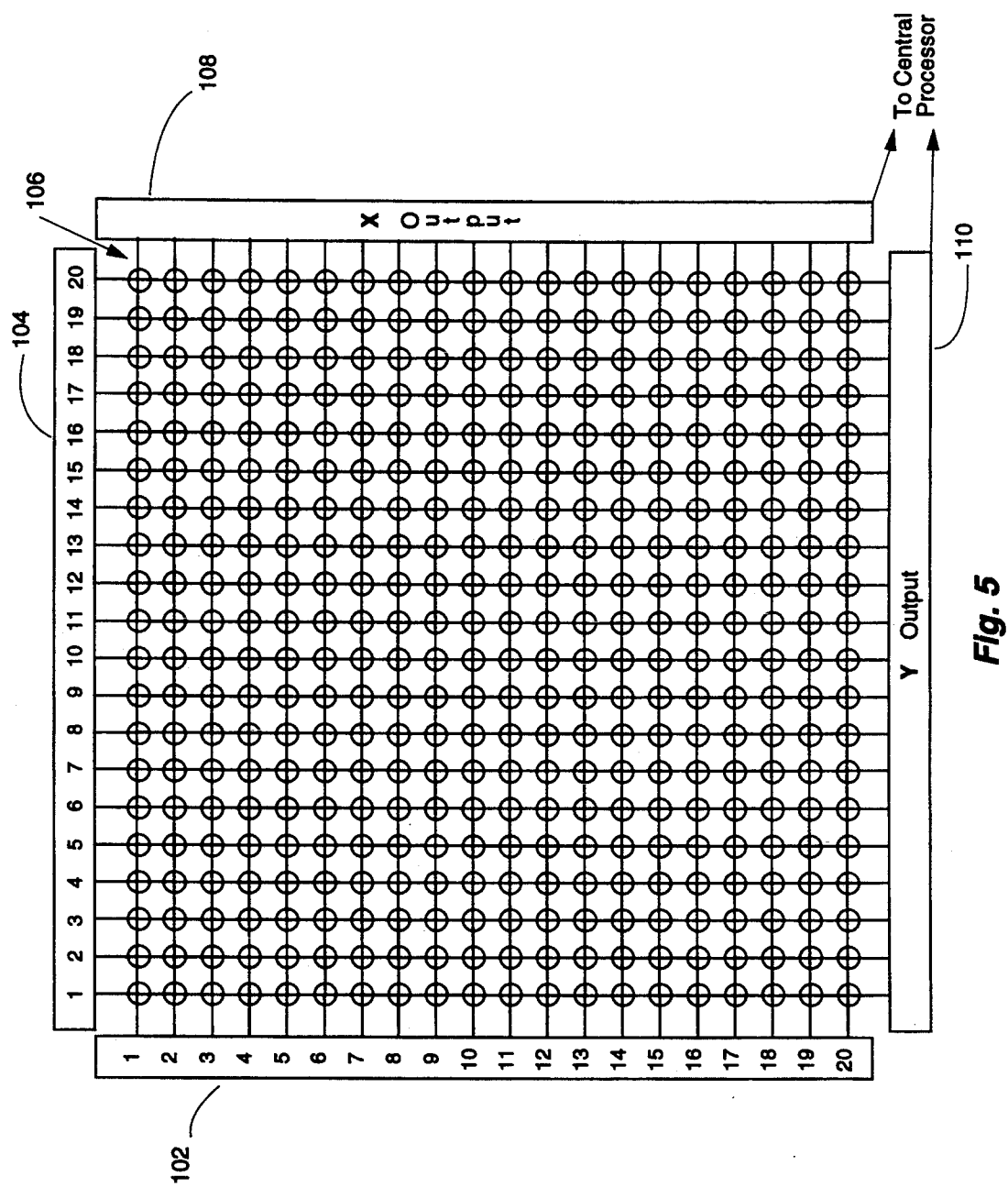
FIG. 5 illustrates a fiber-optic arrangement for temperature transient detection in an array of superconducting magnets.

The system shown in FIG. 4 can be configured to monitor an array 106 of magnets, such as shown in FIG. 5. If one fiber of each fiber pair forms a fiber along x-inputs 102 and the other fiber forms a fiber along y-inputs 104, each fiber has only one magnet in common with any other fiber. Then an array of 400 magnets may be monitored with only 40 detectors, as shown in FIG. 5. Various fibers are designated as reference arms for combination with signal fibers with which the reference fibers do not share a magnet. X-output fibers 108 and y-output fibers 110 are readily combined to form appropriate feedback loops for phase shifters 84 (FIG. 4) and for outputs to a monitoring system that provides a coincidence detection on two detectors to both detect and localize a temperature transient. It will be appreciated that the detection array shown in FIG. 5 can significantly increase the discrimination against false temperature transient alarms since two fibers must indicate a temperature transient and a single temperature transient indication in a fiber is ignored.

A demonstration system according to FIGS. 1 and 3 was constructed to verify system stability and sensitivity. A nichrome wire was wrapped around the signal arm to simulate a temperature transient condition heating. The steady state system at room temperature was extremely stable and no significant output signal was observed even when the signal arm was subject to mechanical shock.

To test both slow and fast thermal effects, the nichrome coil was heated with both a dc input and a capacitor discharge. Heating with 100 mA dc produced no observable signal. However, when the heater was pulsed with a capacitor discharge on the order of 140 microjoules, an output signal of about one-tenth maximum was observed. A series of tests was also conducted with the apparatus immersed in a bath of liquid nitrogen. The liquid nitrogen had no effect on the fiber transmission or on the interferometer operation. The nichrome wire was attached to a 5500 microfarad capacitor that was charged to 20 volts and discharged through the wire. The sensitivity of the system was calculated to be 0.75 K./fringe shift, indicating a system sensitivity of about 0.23 mK.

Figure 6:
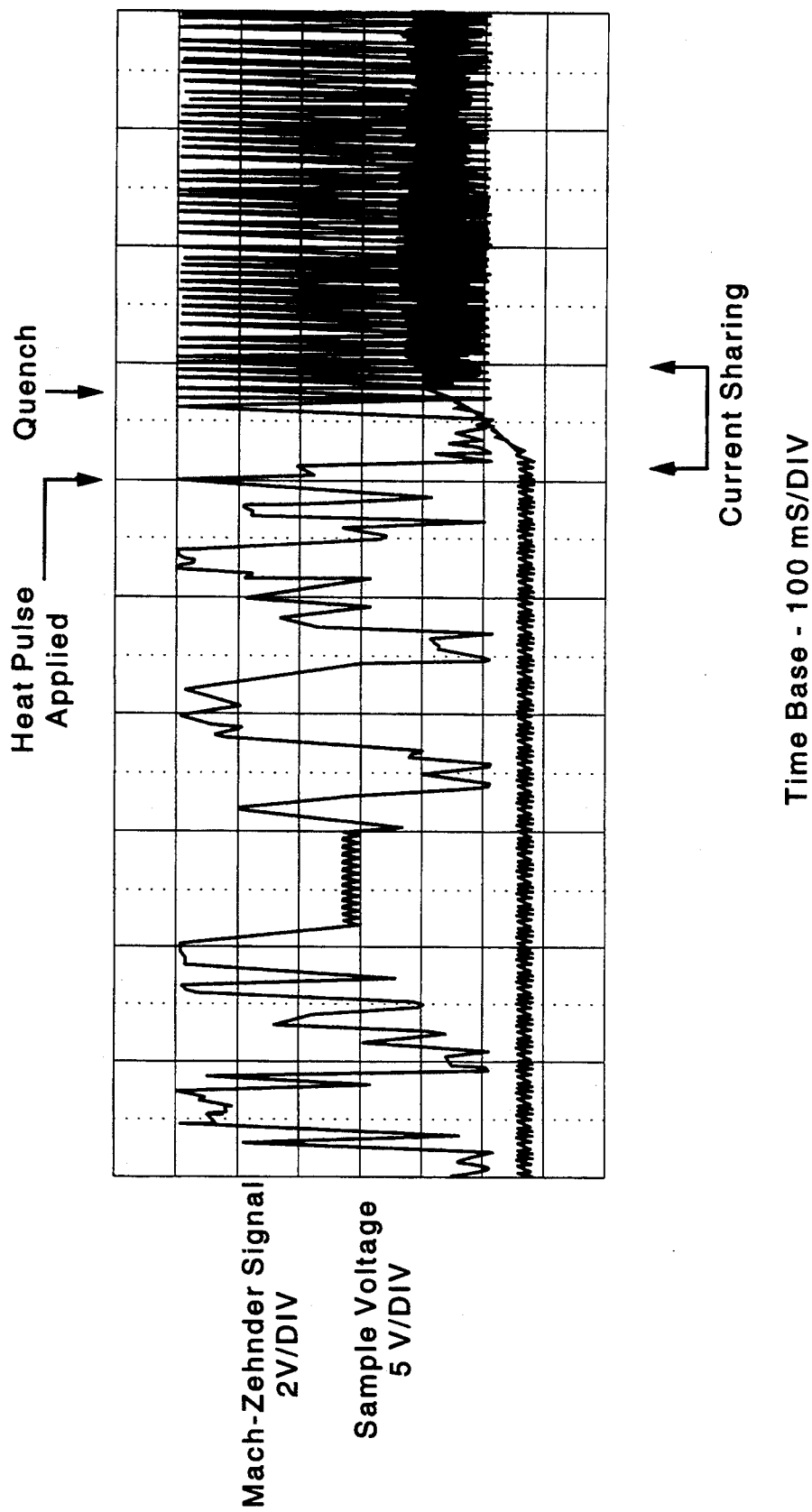
FIG. 6 is a photographic of an oscilloscope output from a test sample showing the onset and detection of an actual quench condition.

FIG. 6 is a photograph of an oscilloscope trace of the output of detector 28 along with the voltage across a superconducting sample material at a temperature of about 4.2 K. A heat pulse was applied to the entire length of the test element (about 3 m). The time of application of the heat pulse was just before the sample voltage begins to increase. The steady periodic response from the detector is indicative of a steady change in the optical length of the signal fiber adjacent the test element. For this case, an approximate time difference from onset of sample voltage rise to interferometer detector signal (fringe) registration was about 60 msec. At the time of quench, the detector fringe frequency was observed to be about 75 Hz, compared with a background frequency of about 2.5 Hz.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for detecting a temperature transient in a superconducting magnet comprising:
   a signal optical fiber within said superconducting magnet for responding to a temperature transient condition of said superconducting magnet;
   a reference optical fiber remote from said signal optical fiber;
   coherent light source means for outputting coherent light to said signal and reference optical fibers;
   a phase modulator connected to said signal optical fiber or said reference optical fiber to provide a phase shift of 90° to said coherent light in said signal or reference optical fiber;
   a peak signal sample and hold circuit connected to said phase modulator for feeding back light output from said signal or reference optical fiber to stabilize said phase modulator;
   interferometer means for detecting a relative phase difference in coherent light output from said signal and reference optical fibers;
   means for combining coherent light output from said signal and reference optical fibers;
   a detector receiving said combined coherent light output and outputting an electrical signal related to said relative phase difference arising from said temperature transient condition in said superconducting magnet; and
   a low pass filter receiving said electrical signal and outputting a feed back signal to said peak signal sample and hold circuit to cancel slow effects from said superconducting magnet.

2. Apparatus according to claim 1, further including a high pass filter receiving said electrical signal and outputting a signal including fast perturbations due to said temperature transient.

3. Apparatus for detecting a temperature transient in an array of superconducting magnets, comprising:
   a first signal optical fiber within a first plurality of superconducting magnets;
   a first reference optical fiber within a second plurality of superconducting magnets distinct from said first plurality of magnets;
   coherent light source means for outputting coherent light to said signal and reference optical fibers;
   a phase modulator connected to said signal optical fiber or said reference optical fiber to provide a phase shift of 90° to said coherent light in said signal or reference optical fiber;
   a peak signal sample and hold circuit connected to said phase modulator for feeding back light output from said signal or reference optical fiber to stabilize said phase modulator;
   means for combining coherent light output from said signal and reference optical fibers;
   interferometer means for detecting a relative phase difference in coherent light output from said signal and reference optical fibers;
   a detector receiving said combined coherent light output and outputting an electrical signal related to said relative phase difference arising from said temperature transient condition in said first and second plurality of superconducting magnets; and
   a low pass filter receiving said electrical signal and outputting a feed back signal to said peak signal sample and hold circuit to cancel slow effects from said first and second plurality of superconducting magnets.

4. A fiber optic system according to claim 3, further including a high pass filter receiving said electrical signal and outputting a signal including fast perturbations due to said temperature transient.

5. A fiber optic system according to claim 3, further including a second signal optical fiber within a third plurality of said superconducting magnets distinct from said second plurality of magnets, said first and third plurality of magnets having one superconducting magnet in common.

6. A fiber optic system according to claim 5, further including a high pass filter receiving said electrical signal and outputting a signal including fast perturbations due to said temperature transient.

* * * * *